United States Patent
Holmes et al.

(10) Patent No.: US 7,027,295 B2
(45) Date of Patent: Apr. 11, 2006

(54) COMPACT DESIGN FOR HANDHELD COMPUTING DEVICE HAVING LCD DISPLAY

(75) Inventors: John Holmes, Waterloo (CA); Marc A. Drader, Waterloo (CA); Chao Chen, Waterloo (CA); Robert Lowles, Waterloo (CA); Robert W. Phillips, Waterloo (CA); Doug Fregin, Waterloo (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 10/857,974

(22) Filed: Jun. 2, 2004

(65) Prior Publication Data

US 2005/0270729 A1    Dec. 8, 2005

(51) Int. Cl.
*H05K 5/02*    (2006.01)
(52) U.S. Cl. ...................... 361/681; 345/864; 348/839

(58) Field of Classification Search ............... 345/718, 345/864; 361/679–687, 724–727; 348/838, 348/839; 708/109; 362/561
See application file for complete search history.

(56) References Cited

U.S. PATENT DOCUMENTS

| 6,220,741 | B1 * | 4/2001 | Kawachi et al. ............ 362/561 |
| 6,457,071 | B1 * | 9/2002 | Thorland et al. ............. 710/19 |
| 6,816,366 | B1 * | 11/2004 | Ko .............................. 361/683 |
| 2002/0167805 | A1 | 11/2002 | Lee ........................... 361/772 |

FOREIGN PATENT DOCUMENTS

EP    0888 036 A1    12/1988

\* cited by examiner

*Primary Examiner*—Hung Van Duong
(74) *Attorney, Agent, or Firm*—Heenan Blaikie LLP

(57) ABSTRACT

A handheld computing device includes a system motherboard; and a display secured to the system motherboard. The display comprises a display panel, and a circuit board carrying display electronics for the display panel. The system motherboard includes a cavity, and the display electronics extend from the circuit board into the cavity. Preferably, the cavity comprises an aperture, and the display electronics are compactly disposed on the circuit board within a common area that is aligned with the aperture.

14 Claims, 4 Drawing Sheets

COMPACT DESIGN FOR HANDHELD COMPUTING DEVICE HAVING LCD DISPLAY

FIELD OF THE INVENTION

The invention described herein relates to a handheld computing device. In particular, the invention described herein relates to a configuration for a compact handheld computing device having a LCD display.

BACKGROUND OF THE INVENTION

The conventional handheld computing device, such as a PDA, or a wireless telephone, includes a keyboard/keypad, a display and a system motherboard (not shown) disposed within a common housing. The display is typically provided as a reflective, transmissive or transreflective LCD display panel.

To limit power losses and the effects of noise on image quality, the LCD display electronics must be disposed in close proximity to the LCD display panel. Accordingly, the LCD display electronics are provided on a printed circuit board that is housed within a plastic or metal support frame, together with the LCD display panel. The frame is then secured to the motherboard with permanent adhesive or screws.

To prevent the display electronics from making contact with the motherboard electronics, the frame maintains a small gap between the display electronics on the printed circuit board and the electronics on the motherboard. However, this design increases the thickness of the computing device. For instance, in the conventional handheld computing device, a gap of approximately 1.5 mm must be maintained between the display electronics and the motherboard electronics (1.2 mm to account for the height of the display electronics; and an additional 0.3 mm to account for the required clearance between the display electronics and the motherboard electronics).

In the case of a wireless-enabled computing device, typically the antenna and RF electronics are disposed near the uppermost end of the computing device to avoid attenuation of the RF signal by the user's hand as the user holds the device. Since this position for the RF electronics within the housing coincides with that of the display, the gap between the display electronics and the motherboard electronics must be increased. This latter design further increases the thickness of the computing device.

Therefore, there is a need for a configuration for a handheld computing device that allows the thickness of the device to be reduced.

SUMMARY OF THE INVENTION

According to the invention described herein, there is provided a handheld computing device that includes an aperture provided in the system motherboard, through which the display electronics can at least partially extend.

According to one aspect of the invention described herein, there is provided a handheld computing device that includes a system motherboard; and a display secured to the system motherboard. The display comprises a display panel, and a circuit board caring display electronics for the display panel. The system motherboard includes a cavity, and the display electronics extend from the circuit board into the cavity.

According to another aspect of the invention described herein, there is provided a display for a handheld computing device. The display comprises a display panel; and a circuit board carrying display electronics for the display panel. The display electronics are disposed compactly with a common area on the circuit board.

In one implementation, the cavity comprises an aperture, and the display electronics are compactly disposed on the circuit board within a common area that is aligned with the aperture.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
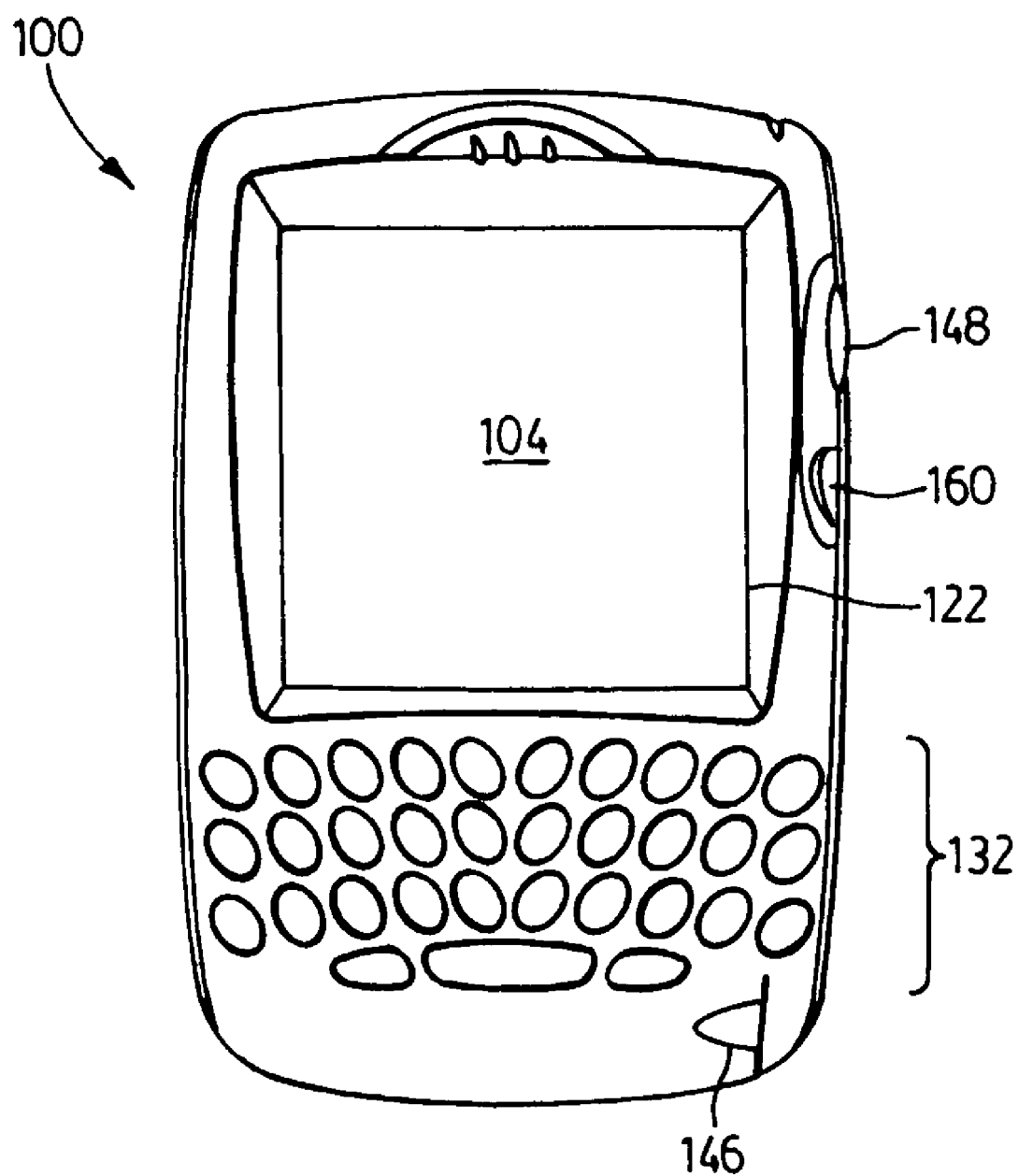
FIG. 1 is a front plan view of a handheld computing device, according the invention described herein.

Referring now to FIG. 1, there is shown a handheld computing device, denoted generally as 100, provided according to one aspect of the invention. The handheld computing device 100 includes a display 122, a function key 146 and a system motherboard 102 (not shown) disposed within a common housing. The display 122 is a self-contained peripheral device that is connected to the system motherboard.

The function key 146 functions as a power on/off switch for the handheld computing device 100, and may also function as a backlight key for the display 122.

In addition to the display 122 and the function key 146, the handheld computing device 100 includes user data input means for inputting data to the data processing means. As shown, preferably the user data input means includes a keyboard 132, a thumbwheel 148 and an escape key 160.

Typically, the handheld computing device 100 is a two-way wireless communication device having at least voice and data communication capabilities. Further, preferably the handheld computing device 100 has the capability to communicate with other computer systems on the Internet. Depending on the exact functionality provided, the wireless handheld computing device 100 may be referred to as a data messaging device, a two-way pager, a wireless e-mail device, a cellular telephone with data messaging capabilities, a wireless Internet appliance, or a data communication device, as examples.

Figure 2:
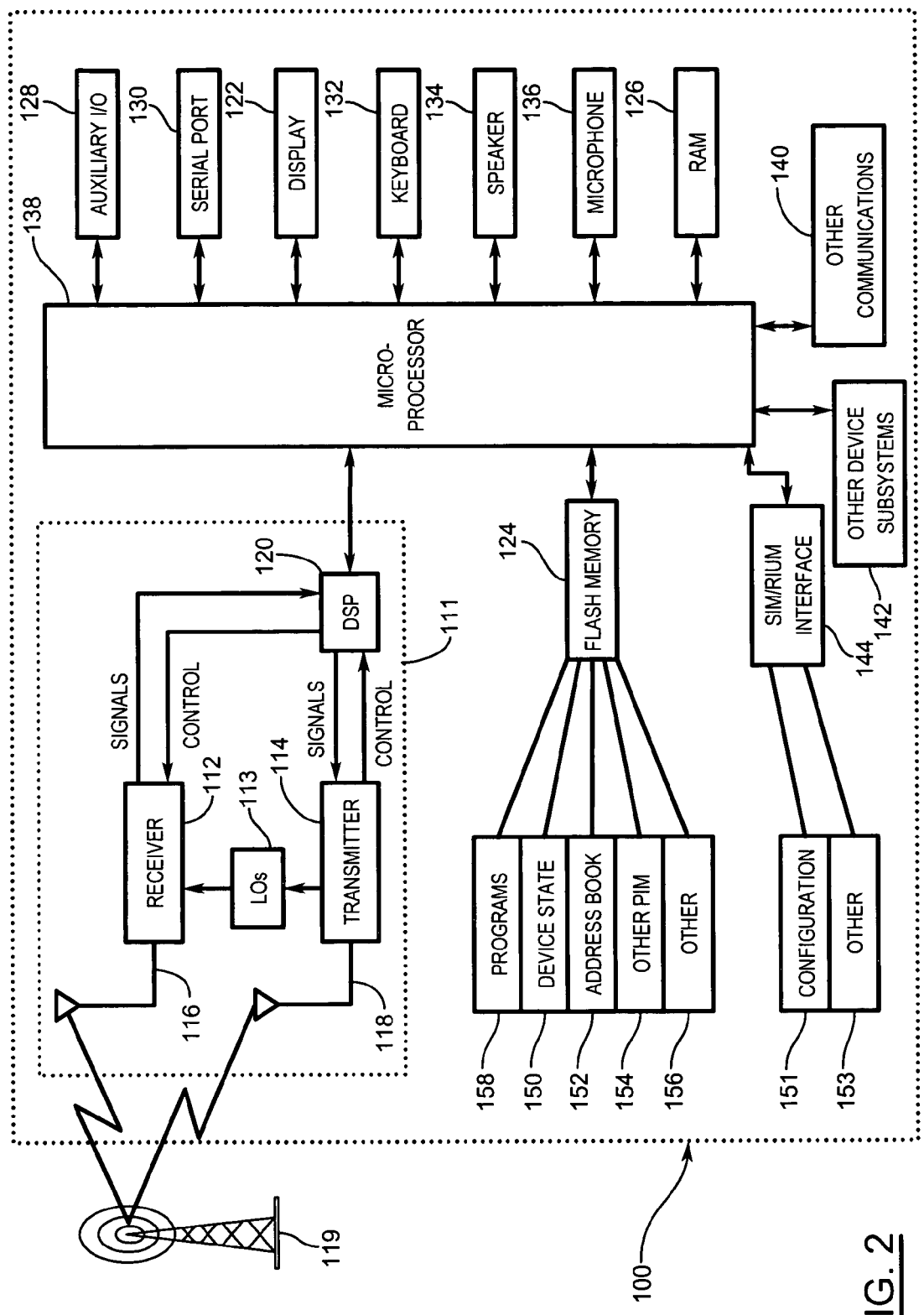
FIG. 2 is a schematic view depicting functional details of the handheld computing device.

FIG. 2 depicts functional details of the handheld computing device 100. Where the handheld computing device 100 is enabled for two-way communication, the motherboard 102 will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, the handheld computing device 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, the handheld computing device 100 is registered on the network using a unique identification number associated with each handheld computing device. In UMTS and GPRS networks, and in some CDMA networks, however, network access is associated with a subscriber or user of the handheld computing device 100. A GPRS handheld computing device therefore requires a subscriber identity module (SIM) card in order to operate on a GPRS network, and a RUIM in order to operate on some CDMA networks. Without a valid SIM/RUIM card, a GPRS/UMTS/CDMA handheld computing device may not be fully functional. Local or non-network communication functions, as well as legally required functions (if any) such as "911" emergency calling, may be available, but the handheld computing device 100 will be unable to carry out any other functions involving communications over the network. The SM/RUIM interface 144 is normally similar to a card-slot into which a SIM/RUIM card can be inserted and ejected like a diskette or PCMCIA card. The SIM/RUIM card can have approximately 64K of memory and hold many key configuration 151, and other information 153 such as identification, and subscriber related information.

When required network registration or activation methods have been completed, the handheld computing device 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

The handheld computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Typically, the communication subsystem 111, flash memory 124, RAM 126, I/O subsystems 128, serial port 130, keyboard 132, speaker 134, microphone 136, microprocessor 138, and the subsystems 140, 142 are provided on the motherboard 102, and the display 122 is provided as a self-contained unit that is physically mounted, and electrically connected, to the motherboard 102. This aspect of the invention will be discussed in further detail below.

Some of the subsystems shown in FIG. 2 perform communication-related functions, whereas other subsystems may provide "resident" or on-device functions. Some subsystems, such as keyboard 132 and display 122, for example, may be used for both communication-related functions, such as entering a text message for transmission over a communication network, and device-resident functions such as a calculator or task list.

The operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. Received communication signals may also be stored in RAM 126.

As shown, the flash memory 124 can be segregated into different areas for both computer programs 158 and program data storage 150, 152, 154 and 156. These different storage areas indicate that each program can allocate a portion of flash memory 124 for their own data storage requirements. In addition to its operating system functions, preferably the microprocessor 138 enables execution of software applications on the handheld computing device. A predetermined set of applications that control basic operations, will normally be installed on the handheld computing device 100 during manufacturing. One set of basic software applications might perform data and/or voice communication functions, for example.

A preferred software application may be a personal information manager (PIM) application having the ability to organize and manage data items relating to the user of the handheld computing device such as, but not limited to, e-mail, calendar events, voice mails, appointments, and task items. Naturally, one or more memory stores would be available on the handheld computing device to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the user's corresponding data items stored or associated with a host computer system.

Further applications may also be loaded onto the handheld computing device 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the handheld computing device 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of the handheld computing device 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the handheld computing device 100 is similar, except that received signals would preferably be output to a speaker 134 and signals for transmission would be generated by a microphone 136. Alternative voice or audio I/O subsystems, such as a voice message recording subsystem, may also be implemented on the handheld computing device 100. Although voice or audio signal output is preferably accomplished primarily through the speaker 134, display 122 may also be used to provide an indication of the identity of a calling party, the duration of a voice call, or other voice call related information for example.

Serial port 130 in FIG. 2, would normally be implemented in a personal digital assistant (PDA)-type handheld computing device for which synchronization with a user's desktop computer (not shown) may be desirable. The serial port 130 enables a user to set preferences through an external device or software application and would extend the capabilities of the handheld computing device 100 by providing for information or software downloads to the handheld computing device 100 other than through a wireless communication network.

Other communications subsystems 140, such as a short-range communications subsystem, is a further optional component which may provide for communication between the handheld computing device 100 and different systems or devices, which need not necessarily be similar devices. For example, the subsystem 140 may include an infrared device and associated circuits and components or a Bluetooth™ communication module to provide for communication with similarly enabled systems and devices.

Figure 4:
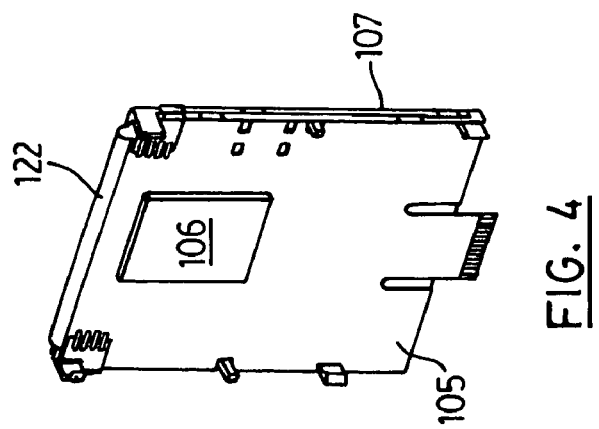
FIG. 4 is a rear perspective view of the LCD display of the handheld computing device.
Figure 3:
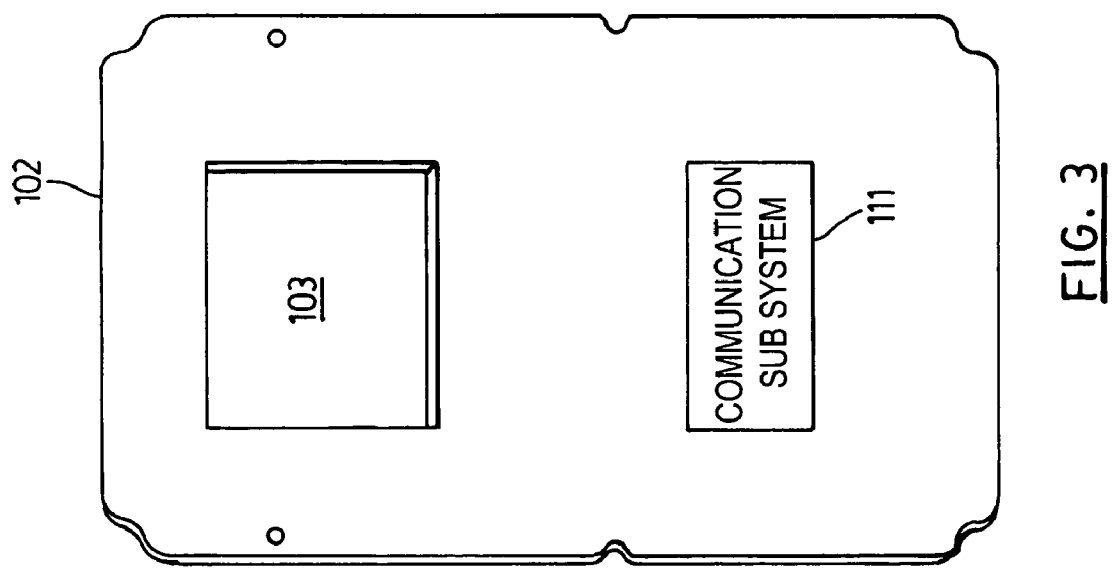
FIG. 3 is a front plan view of the motherboard of the handheld computing device, depicting the location of the communication subsystem.

FIG. 3 depicts the physical structure of the motherboard 102; and FIG. 4 depicts the physical structure of the rear of the display 122. As discussed above, the communication subsystem 111 (including the receiver 112, transmitter 114, and antenna elements 116, 118), flash memory 124, RAM 126, I/O subsystems 128, serial port 130, keyboard 132, speaker 134, microphone 136, microprocessor 138, and the subsystems 140, 142 are provided on the motherboard 102. The display 122 is physically mounted, and electrically connected, to the motherboard 102.

As shown, the communication subsystem 111 is disposed adjacent the lowermost end of the motherboard 102. Further, the communications subsystem 111 includes a cavity 103 disposed adjacent the uppermost end of the motherboard 102. Preferably, the cavity 103 is provided as an aperture or hole that extends through the motherboard 102, from the upper surface thereof to the lower surface thereof.

The display 122 is provided as a self-contained unit that includes a display panel 104 (see FIG. 1), and a printed circuit board 105 that carries the display electronics 106. Preferably, the display panel 104 comprises a LCD display panel. The display panel 104 and the display electronics 106 are retained together within a common support frame 107. As shown, the LCD display electronics 106 are disposed compactly within a common area on the circuit board 105.

Figure 5:
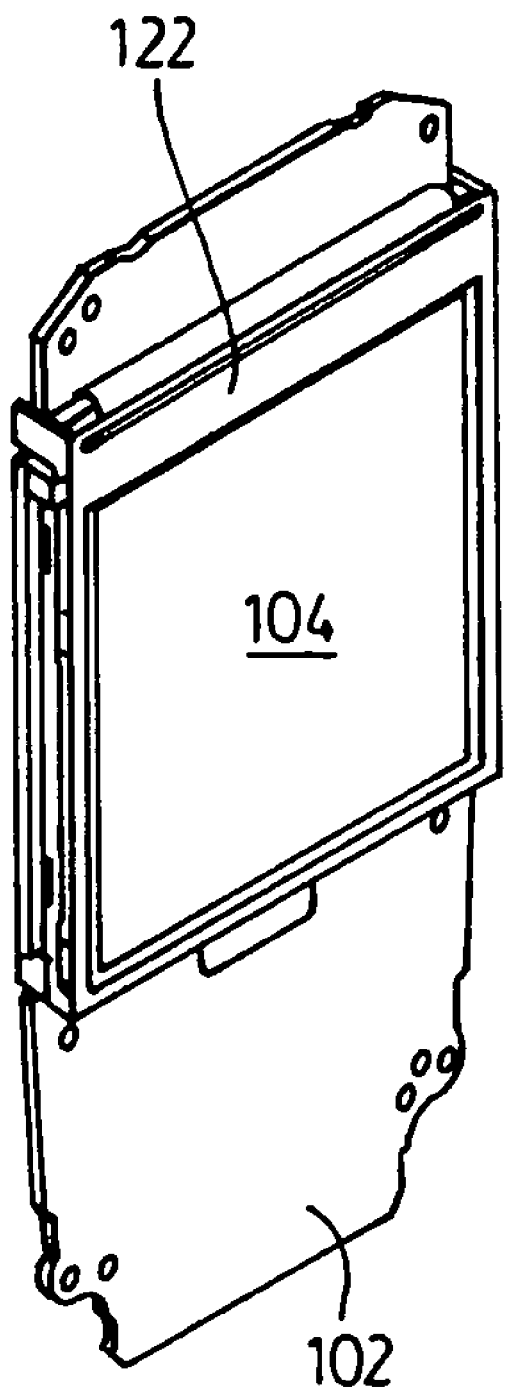
FIG. 5 is perspective view of the LCD display secured to the motherboard.

As shown in FIG. 5, the display 122 is mounted to the motherboard 102 by aligning the LCD display electronics 106 with the cavity 103, and then securing the support frame 107 to the motherboard 102. Typically, the support frame 107 is secured to the motherboard 102 with adhesive or other suitable fasteners.

When the display 122 is mounted to the motherboard 102, the display electronics 106 extend from the circuit board 105 into the cavity 103. Since the display electronics 106 are disposed within the cavity 103, only a small gap (e.g. 0.6 mm) need be maintained between the display electronics 106 and the electronics on the motherboard 102. This gap is provided to allow the display 122 to move relative to the motherboard 102 when the handheld computing device 100 is subject to an impact, such as when the handheld computing device 100 is dropped. As will be apparent, this gap is significantly less than that required by conventional handheld computing devices.

Alternately, this gap can be eliminated, if the stress placed on the display 122 is of no concern. In either case, the thickness of the handheld computing device 100 is less than prior art handheld computing devices.

As will be appreciated, although the cavity 103 is shown in this example as an aperture, the cavity 103 can instead by provided as an undercut or recessed area that has a depth sufficient to accommodate the display electronics 106 therein. In this variation, preferably the maximum thickness of the display 122 is between one and ten times the average depth of the recessed area 103.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. A handheld computing device comprising:
 a system motherboard including a region devoid of electronic circuitry; and
 a display mounted to the motherboard, the display comprising a display panel and a circuit board carrying display electronics for the display panel, the display electronics being disposed within a common area of the circuit board, the display electronics being aligned with the devoid region and extending from the common area into the devoid region, the display electronics and the electronic circuitry on the motherboard being separated by a small gap that permits the display to move relative to the motherboard when the handheld computing device is subjected to an impact.

2. The handheld computing device according to claim 1, wherein the region comprises an aperture that extends through the motherboard.

3. The handheld computing device according to claim 1, wherein the region comprises a recessed area having a depth sufficient to accommodate the display electronics therein.

4. The handheld computing device according to claim 3, wherein the display has a maximum thickness that is between one and ten times an average depth of the recessed area.

5. The handheld computing device according to claim 3, further including an adhesive layer disposed between the system motherboard and the display and securing the display to the motherboard.

6. The handheld computing device according to claim 5, wherein the adhesive layer comprises a resilient adhesive layer, the resilient adhesive layer and the gap facilitating said display movement.

7. The handheld computing device according to claim 6, wherein the handheld computing device is a wireless communications device.

8. A display for mounting to a motherboard of a handheld computing device, the motherboard including a region devoid of electronic circuitry, the display, comprising:
   a display panel;
   a circuit board carrying display electronics for the display panel, the display electronics being disposed within a common area on the circuit board, the common area having a size less than the region; and
   a support frame securing the display panel to the circuit board, when the display is mounted to the motherboard the display electronics extending from the common area into the region, and the support frame providing a small gap between the display and motherboard that permits the display to move relative to the motherboard when the handheld computing device is subjected to an impact.

9. The display for a handheld computing device according to claim 8, wherein the region comprises an aperture that extends through the motherboard.

10. The display for a handheld computing device according to claim 9, wherein the air gap is approximately 0.6 millimeters.

11. The display according to claim 9, wherein the region comprises a recessed area, and the display electronics has a thickness less than a depth of the recessed area.

12. The display according to claim 9, further including an adhesive layer secured to the support frame for mounting the display to the motherboard.

13. The display according to claim 11, wherein the display has a maximum thickness that is between one and ten times an average depth of the recessed area.

14. The display according to claim 12, wherein the adhesive layer comprises a resilient adhesive layer, the resilient adhesive layer and the gap facilitating said display movement.

* * * * *